US008547274B2

(12) United States Patent  (10) Patent No.: US 8,547,274 B2
Reinpoldt, III  (45) Date of Patent: Oct. 1, 2013

(54) INCLUSION OF ASSESSMENT DATA IN MILLIMETER WAVE CONCEALED OBJECT DETECTION SYSTEMS

(75) Inventor: Willem H. Reinpoldt, III, Windermere, FL (US)

(73) Assignee: Microsemi Corporation, Aliso Viejo, CA (US)

( * ) Notice: Subject to any disclaimer, the term of this patent is extended or adjusted under 35 U.S.C. 154(b) by 609 days.

(21) Appl. No.: 12/338,780

(22) Filed: Dec. 18, 2008

(65) Prior Publication Data

US 2009/0184861 A1   Jul. 23, 2009

Related U.S. Application Data

(60) Provisional application No. 61/014,695, filed on Dec. 18, 2007.

(51) Int. Cl.
*G01S 13/89* (2006.01)
(52) U.S. Cl.
USPC .............................. 342/22; 342/27; 342/179
(58) Field of Classification Search
USPC .................. 342/22, 27, 179; 250/208.1, 221, 250/225, 336.1, 341.1, 341.8, 353, 363.02
See application file for complete search history.

(56) References Cited

U.S. PATENT DOCUMENTS

| 6,242,740 | B1 * | 6/2001 | Luukanen et al. | 250/353 |
|---|---|---|---|---|
| 6,342,696 | B1 * | 1/2002 | Chadwick | 250/225 |
| 6,359,582 | B1 * | 3/2002 | MacAleese et al. | 342/22 |
| 6,777,684 | B1 * | 8/2004 | Volkov et al. | 250/341.1 |
| 6,894,636 | B2 * | 5/2005 | Anderton et al. | 342/22 |
| 7,180,441 | B2 * | 2/2007 | Rowe et al. | 342/22 |
| 7,205,926 | B2 * | 4/2007 | Rowe et al. | 342/22 |
| 7,265,709 | B2 * | 9/2007 | Fleisher et al. | 342/22 |
| 7,280,068 | B2 * | 10/2007 | Lee et al. | 342/22 |
| 7,450,052 | B2 * | 11/2008 | Hausner et al. | 342/22 |
| 7,495,218 | B2 * | 2/2009 | Gopalsami et al. | 250/336.1 |
| 7,781,717 | B2 * | 8/2010 | Reinpoldt, III | 250/208.1 |
| 7,973,697 | B2 * | 7/2011 | Reilly et al. | 342/22 |
| 8,129,684 | B2 * | 3/2012 | Mueller | 250/341.8 |
| 8,350,747 | B2 * | 1/2013 | DeLia et al. | 342/22 |
| 2004/0140924 | A1 * | 7/2004 | Keller et al. | 342/22 |
| 2005/0230604 | A1 * | 10/2005 | Rowe et al. | 250/221 |
| 2005/0231416 | A1 * | 10/2005 | Rowe et al. | 342/22 |

(Continued)

FOREIGN PATENT DOCUMENTS

WO   WO 2007148327 A2 * 12/2007

OTHER PUBLICATIONS

Hua-Mei Chen; Seungsin Lee; Rao, R.M.; Slamani, M.-A.; Varshney, P.K.;, "Imaging for concealed weapon detection: a tutorial overview of development in imaging sensors and processing," Signal Processing Magazine, IEEE , vol. 22, No. 2, pp. 52-61, Mar. 2005.*

(Continued)

*Primary Examiner* — John B Sotomayor
(74) *Attorney, Agent, or Firm* — Holland & Hart LLP

(57) ABSTRACT

A millimeter wave object detection system includes a millimeter wave imager and a data entry device configured to assign assessment information to events where a concealed object is detected by an operator/observer or automated computer program interrogating imagery produced by the millimeter wave imager. A computer is programmed to store assessment data from the data entry device into a database, and statistical operations can be performed upon the database.

19 Claims, 4 Drawing Sheets

(56) References Cited

U.S. PATENT DOCUMENTS

| | | | |
|---|---|---|---|
| 2007/0235652 A1* | 10/2007 | Smith | 250/363.02 |
| 2008/0211711 A1* | 9/2008 | Mostov et al. | 342/179 |
| 2009/0045343 A1* | 2/2009 | Breit et al. | 250/341.8 |
| 2009/0058710 A1* | 3/2009 | Levitan et al. | 342/22 |
| 2009/0184861 A1* | 7/2009 | Reinpoldt, III | 342/22 |
| 2012/0105267 A1* | 5/2012 | DeLia et al. | 342/22 |
| 2013/0050007 A1* | 2/2013 | Ammar | 342/22 |

OTHER PUBLICATIONS

Costianes, P.J.; , "An overview of concealed weapons detection for homeland security," Applied Imagery and Pattern Recognition Workshop, 2005. Proceedings. 34th, vol., No., pp. 5 pp. 6, Dec. 1-1, 2005.*

Novak, D.; Waterhouse, R.; Farnham, A.; , "Millimeter-wave weapons detection system," Applied Imagery and Pattern Recognition Workshop, 2005. Proceedings. 34th, vol., No., pp. 6 pp. 20, Dec. 1-1, 2005.*

* cited by examiner

INCLUSION OF ASSESSMENT DATA IN MILLIMETER WAVE CONCEALED OBJECT DETECTION SYSTEMS

This Application claims the benefit of U.S. Provisional Patent Application No. 61/014,695 filed Dec. 18, 2007, the entire disclosure of which is incorporated herein by reference. This application relates to the subject matter of U.S. Provisional Patent Application No. 60/945,266 entitled "System and Method For Overlaying Computer-Generated Highlights In The Display Of Millimeter Wave Computer Imagery" filed Jun. 28, 2007, and U.S. Provisional Patent Application No. 60/951,994 entitled "Graphical User Interface Promoting Improved Operation And Threat Assessment For A Millimeter Wave Concealed Object Detection Camera System" filed Jul. 26, 2007. The entire disclosures of those applications are incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of concealed object detection systems, and in particular to a method and system to gather the assessment results of the analysis of millimeter wave concealed object imagery via manual or automatic data entry.

SUMMARY OF THE INVENTION

A millimeter wave object detection system includes a millimeter wave imager and a data entry device configured to assign assessment information to events where a concealed object is detected by an operator/observer or automated computer program interrogating imagery produced by the millimeter wave imager. A computer is programmed to store assessment data from the data entry device into a database, and statistical operations can be performed upon the database.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same part throughout the various views. The drawings are not necessarily to scale, emphasis instead being placed upon illustrating principles of the invention.

DETAILED DESCRIPTION OF THE PREFERRED EMBODIMENT

Reference will now be made in detail to the preferred embodiments of the present invention, examples of which are illustrated in the accompanying drawings.

The present invention is described below with reference to block diagrams and operational illustrations of methods and devices to gather assessment results of the analysis of millimeter wave concealed object imagery via manual or automatic data entry. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate embodiments, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
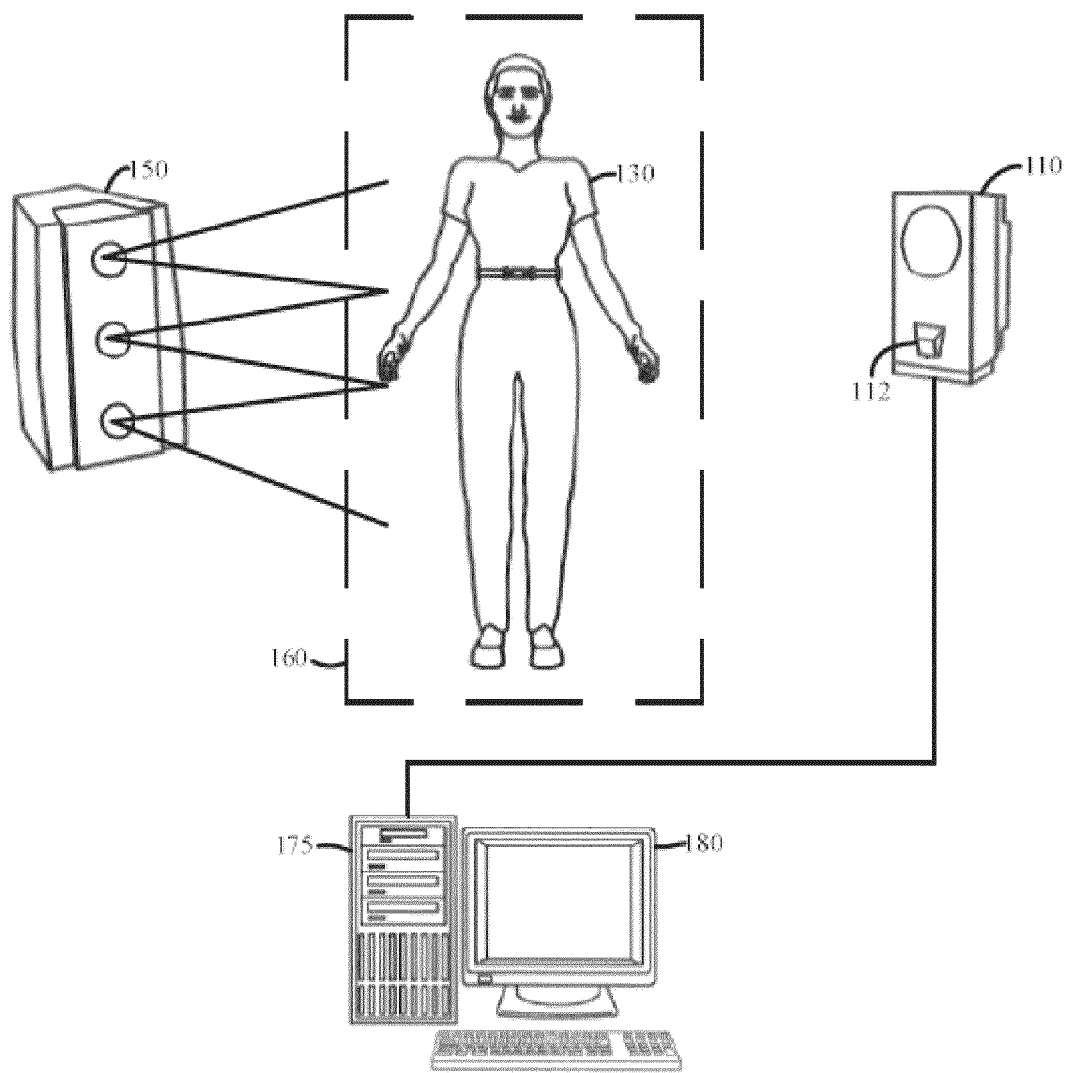
FIG. 1 illustrates one embodiment of a millimeter wave imaging system.

The presently disclosed system and method includes software and hardware components for a millimeter wave imaging system. Such systems typically include a visible spectrum color camera, a millimeter wave camera, a computer, and other components, which operate to detect concealed objects on an individual. One such system is illustrated in FIG. 1. The imaging system includes an imaging zone 160 that may be, in one embodiment, illuminated with millimeter wave energy by an illuminator 150, which may be a projection optics device. One or more millimeter wave cameras 110 focused on the imaging zone detect millimeter wave frequencies reflected from the imaging zone. One or more visible spectrum color video cameras 112 are also focused on the imaging zone. A means is provided for electrically communicating image signals between the video camera, millimeter wave camera, and a central processing unit 175 which receives and processes such signals. The millimeter wave images are synchronized with the video images to a substantially identical time base so that real-time composite images of the millimeter wave images and video images are generated. Software is provided in the central processing unit 175 for detecting a concealed object on the individual by identifying differences in the millimeter wave energy generated, absorbed or reflected by the individual and the concealed object received by the millimeter wave camera. The system includes a display means 180 for displaying the composite images on a video monitor, the composite images showing the concealed object on the individual.

The presently disclosed system and method provides a means to gather assessment data from millimeter wave concealed object detection events and subsequently analyze or allow the analysis of the data for purposes including, but not limited to, data driven risk management and mitigation, electronic assessment reporting, providing decision support, evaluation of deployment detections, identification of at-risk sites, implementation of differentiated responses, evaluation and comparison of deployment performance, identification of achievement gaps, data mining, and knowledge discovery.

In an embodiment, the system and method provides software components and methodologies for a millimeter wave concealed object imaging system comprising a computer, visible spectrum color camera, millimeter wave camera, computer software and other components. The system further provides a means to gather the assessment results of the analysis of millimeter wave concealed object imagery via manual or automatic data entry.

In an embodiment, the system and method provides a means to integrate the assessment results into a local or remotely accessible database. The system may provide a means to collect the assessment results from real-time imagery or from archived images, and may further provide a means to gather the assessment results with or without the aid of a computerized concealed object detection engine, either hardware based, software based or both.

The system may provide a conventional or customized means of assessment data collection, including embodiments for conventional keyboards, customized/dedicated switch panels, touch screens, light pen entry, and the like.

For embodiments including a computerized concealed object detection engine, the present system and method further optionally provides means for timing the assessment response interval (interval from time of concealed object detection to the time of operator assessment input) from the millimeter wave camera operator, recording and gauging the responsiveness of the operator.

For embodiments including a computerized concealed object detection engine, the present system and method further optionally provides means for timing the assessment response interval (interval from time of concealed object detection to the time of operator assessment input) from the millimeter wave camera operator, alarming and notifying the authorities in the event the operator is incapacitated.

In yet another embodiment, the system may further provide a methodology and functionality to allow contribution into the database of assessment data from multiple cameras or other sources in the same or multiple locations.

The system in one embodiment is comprised of a data entry device and computer software which stores the assessment data entered into a computerized database. The computer software can optionally perform statistical operations on the data for knowledge discovery, or the statistical analysis can be performed by an external device.

A data entry device is used to assign assessment information to events where a concealed object is detected by an operator/observer or automated computer program interrogating imagery produced by a millimeter wave imager. Optionally, if an automated computer program is used to interrogate the imagery and provide concealed object detection, the computer program may be used to provide direct or operator-assisted entry of the assessment information to events where a concealed object is detected.

Figure 2:
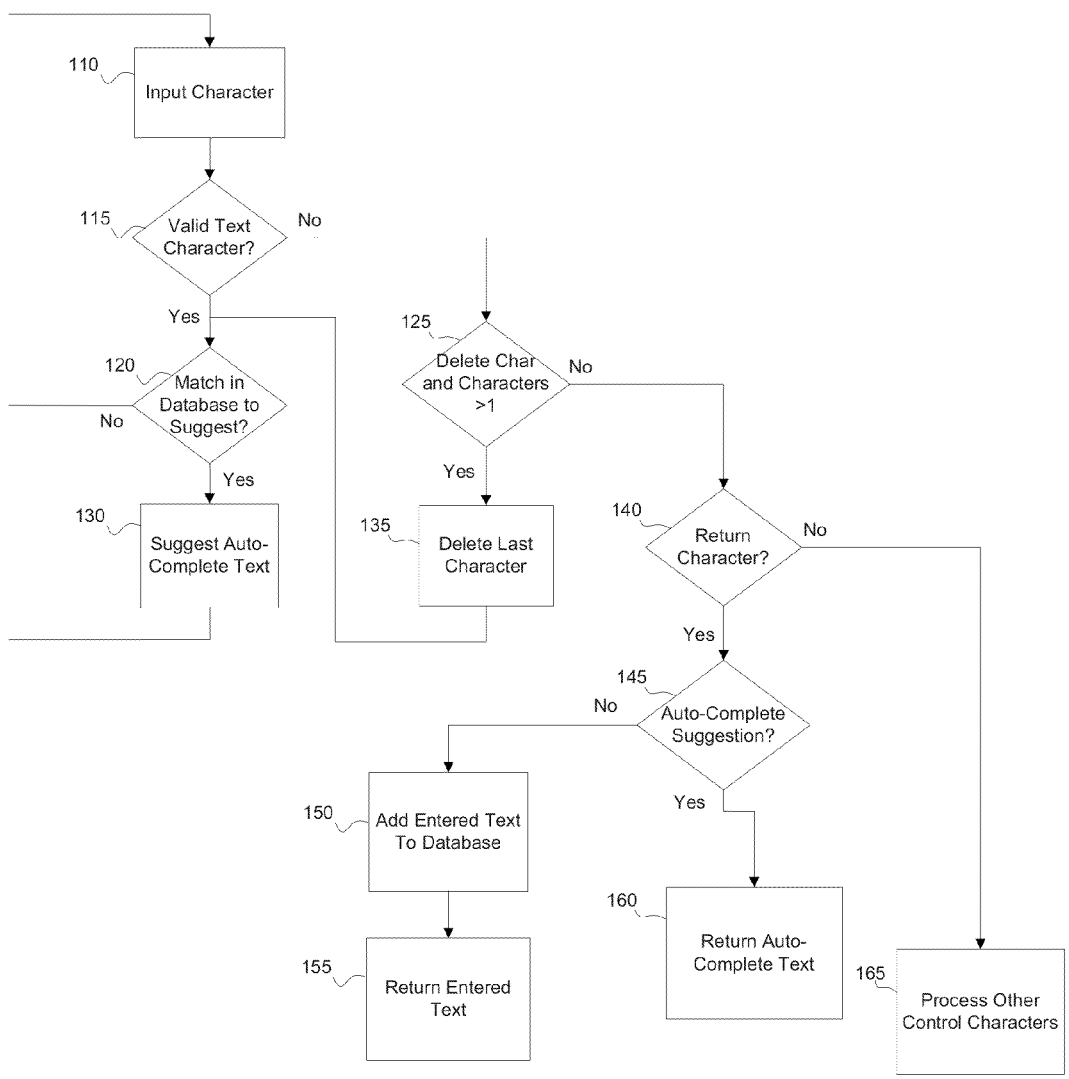
FIG. 2 illustrates one embodiment of a text entry process assisted by auto-complete software algorithms.

In one embodiment, the assessment is chosen from a set of pre-defined assessment conditions including, but not limited to, firearm, knife, explosive, electronics, currency, drugs, contraband, documents, merchandise, nuisance and other. In another embodiment, a method of free-form text entry is used. As illustrated by FIG. 2, the text entry may be assisted by auto-complete software algorithms which suggest the completion of the entry based on analysis of the initial input character(s).

In another embodiment, both the pre-defined assessment conditions and the free-form text entry may be used. In this case, the free-form text entry would provide a means to further describe a pre-defined condition (for example the type of firearm detected or the amount of currency detected) or identify a condition not represented by the pre-defined selections (e.g., other: exotic animal).

Figure 3:
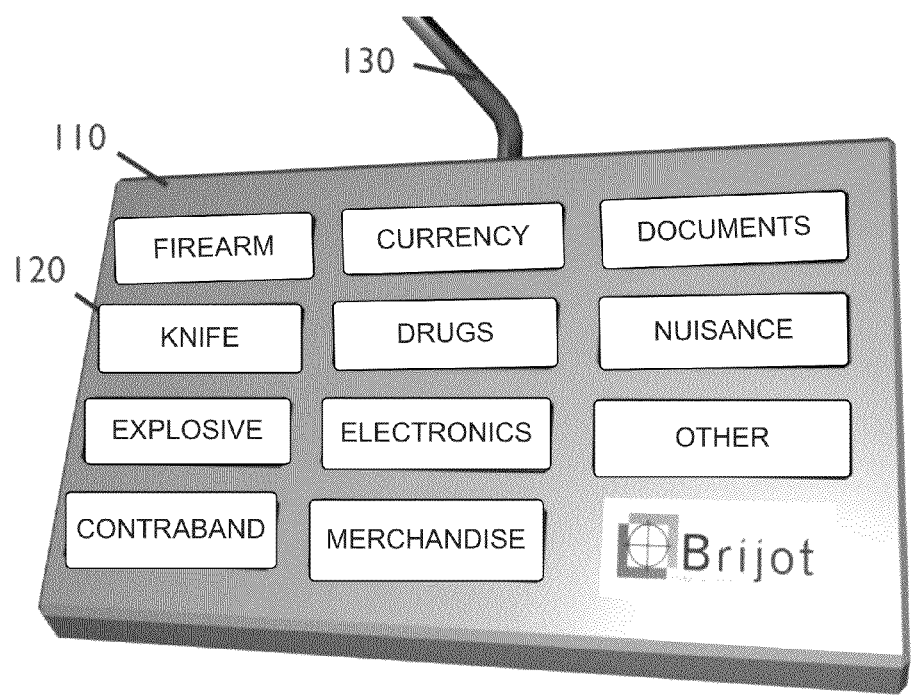
FIG. 3 illustrates one embodiment of a switch panel to assign assessment information.

In one embodiment, the data entry device is a conventional computer keyboard with various keys or key combinations used to assign the assessment information. For example, function keys F1-F12 may be used to select up to twelve assessment choices. In another embodiment, the data entry device may be a customized, dedicated switch panel. For example, see FIG. 3, which illustrates an embodiment of a switch panel or enclosure (110) with various switches (120) used to assign the assessment information. The device may be attached to the millimeter wave camera system via cable (130) or via wireless communication. In yet another embodiment, the data entry device may be a touch screen or light-pen capable computer display with the assessment information chosen from selections on the computer display.

The database containing the assessments of the concealed object detection events may be stored internal to the imaging system, externally on a host computer, or both. The database may then be interrogated by electronic assessment reporting software or other computer programs to provide decision support, data driven risk mitigation, data mining, statistical analysis or other functions.

Figure 4:
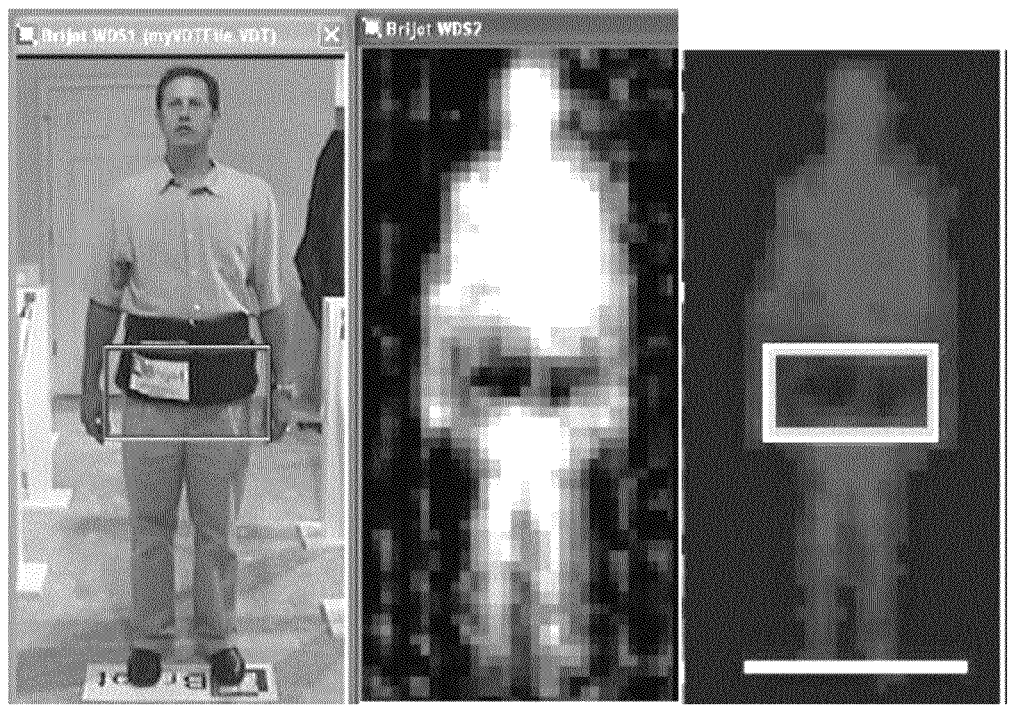
FIG. 4 illustrates one embodiment of a side-by-side display of raw millimeter wave images and synthetic vision images.

In an embodiment of a millimeter wave imaging system, for example, the BIS WDS GEN2 Concealed Object Detection/People Screening system available from Brijot Imaging of Lake Mary, Fla., the system may display one or more images; the live video images received from the visible color camera, the raw millimeter wave images received from the millimeter wave camera, and a synthetic vision Blue Man image received from no video source but instead generated by the computer. See, for example, FIG. 4. These images are typically displayed side-by-side on the Graphical User Interface (GUI). The embodiment may contain an integrated computerized object detection engine, allowing both operator performed and automated detection of concealed objects.

In many embodiments of millimeter wave imaging systems, however, the results of the concealed object detection process are limited to archival of video, sensitivity data and classification of the concealed objects in terms of size and contrast. Any information as to the nature of the concealed object detection event is lost unless manually entered or recorded as part of a separate process. The present system and method allows the capture of the assessment data as part of the functioning of the concealed object detection equipment. Optionally, the system may require assessment data to be entered into the system, and generate an alarm if it is not.

In one embodiment, capture of the assessment data can then be used to generate statistics as to the nature of concealed object detection and assessment data, including, but not limited to, analysis of variance (ANOVA), Chi-square significance tests, cluster analysis, content analysis, correlation, descriptive statistics, dichotomous association, discriminant analysis, hypothesis testing, measures of association, multiple regression analysis, hierarchical linear modeling, multivariate analysis of covariance (MANCOVA), T-tests and time-series analysis. Optionally, the system could be configured for the collection and analysis of assessment data from multiple cameras over the same or different applications, use cases, companies, deployments, cultures and geographic areas.

One example of a use of an embodiment of the system is the detection of a concentrated effort to smuggle large amounts of currency out of a country via multiple checkpoints positioned throughout the country, each equipped with a millimeter wave concealed object detection system and assessment data gathering capabilities. The data generated by the invention may be analyzed by human analysts or by a computer program. Trends can be discovered, and preventive measures can be taken.

Another example of a use of an embodiment of the system is the detection of a concentrated effort to smuggle individually small sized components of a collectively large sized weapon or explosive into an area via multiple checkpoints positioned throughout the area, each equipped with a millimeter wave concealed object detection system and assessment data gathering capabilities. The data generated by the system may be analyzed by human analysts or by a computer program. Trends would be discovered, and preventive measures could be taken.

In one embodiment, the system may be designed such that the collection of the assessment data is optional. Either the assessment data for all concealed object detection events may be optional, or the assessment data for a subset of the concealed object detection events may be optional. An example of the latter instance is the mandatory assessment of weapons detected but optional assessment of non-threat objects such as currency or nuisance objects (cell phones, wallets, pocket watches, etc.).

In another embodiment, the system may measure the time interval between the concealed object detection and the operator assessment. Such data may provide information/metrics as to the responsiveness and attentiveness of the operator, or, alternatively, an extremely long or indefinite time interval between the concealed object detection and the operator assessment may indicate that the operator has been incapacitated. In such case, an automated or human assisted alarm signal may be generated to call for attention and/or assistance to the affected area.

While the invention has been particularly shown and described with reference to a preferred embodiment thereof, it will be understood by those skilled in the art that various changes in form and details may be made therein without departing from the spirit and scope of invention.

The embodiments of the invention in which an exclusive property or privilege is claimed are defined as follows:

1. A millimeter wave object detection system, comprising:
    a millimeter wave imager;
    a data entry device configured to assign assessment information to events where a concealed object on an individual is detected in an image produced by the millimeter wave imager from an imaging zone in which that individual is present; and
    a database configured to store a plurality of images produced by the millimeter wave imager from the imaging zone and, for each of the plurality of images, corresponding assessment data from said data entry device is assigned where a concealed object is detected on an individual present in the imaging zone.

2. The millimeter wave object detection system according to claim 1, wherein the database comprises a statistical analysis module configured to perform statistical operations on a plurality of assessment data entries.

3. The millimeter wave object detection system according to claim 1, wherein the data entry device comprises an automatic assessment engine configured to provide automatic entry of assessment information when a concealed object is detected in the imagery produced by the millimeter wave imager.

4. The millimeter wave object detection system according to claim 1, wherein the assessment information comprises one or more pre-defined assessment conditions including at least one of firearm, knife, explosive, electronics, currency, drugs, contraband, documents, merchandise, nuisance and other.

5. The millimeter wave object detection system according to claim 1, wherein the data entry device comprises an operator interface configured to receive an identification of an assessment condition corresponding to imagery produced by the millimeter wave imager.

6. The millimeter wave object detection system according to claim 5, wherein the operator interface comprises one or more pre-defined assessment conditions including: firearm, knife, explosive, electronics, currency, drugs, contraband, documents, merchandise, nuisance and other.

7. The millimeter wave object detection system according to claim 1, wherein the database is configured to store imagery and corresponding assessment data from a plurality of millimeter wave imagers and data entry devices.

8. The millimeter wave object detection system according to claim 7, wherein the plurality of millimeter wave imagers and data entry devices are in different locations.

9. The millimeter wave object detection system according to claim 1, wherein the database is further configured to generate an alarm based on assessment data from two or more assessment data entries.

10. The millimeter wave object detection system according to claim 9, wherein the two or more assessment data entries are received from data entry devices located at different locations.

11. A threat assessment apparatus, comprising:
    a database configured to receive and store a plurality of assessment data entries produced by one or more millimeter wave imaging systems, each assessment data entry including an image produced from an imaging zone in which an individual is present and corresponding assessment information; and
    an assessment module configured to perform statistical operations on the plurality of assessment data entries.

12. The apparatus of claim 11, wherein the database is configured to store imagery and corresponding assessment data from a plurality of millimeter wave imagers and data entry devices.

13. The apparatus of claim 12, wherein the plurality of millimeter wave imagers and data entry devices are in different locations.

14. The apparatus of claim 11, wherein the assessment module is further configured to generate an alarm based on assessment data from two or more assessment data entries.

15. The apparatus of claim 14, wherein the two or more assessment data entries are received from different locations.

16. The apparatus of claim 14, wherein the two or more assessment data entries are received from different locations within a predefined time period.

17. The apparatus of claim 11, wherein the statistical operations comprise one or more of: analysis of variance (ANOVA), Chi-square significance tests, cluster analysis, content analysis, correlation, descriptive statistics, dichotomous association, discriminant analysis, hypothesis testing, measures of association, multiple regression analysis, hierarchical linear modeling, multivariate analysis of covariance (MANCOVA), T-tests and time-series analysis.

18. The system of claim 1, wherein each of the plurality images comprises an image produced when a person is present in the imaging zone.

19. The apparatus of claim 11, wherein each of the plurality of assessment data entries comprises an image produced when a person is present in the imaging zone.

* * * * *